United States Patent [19]

Birkemeier

[11] 4,347,514

[45] Aug. 31, 1982

[54] TROPOSCATTER SYSTEM ANTENNA ALIGNMENT

[75] Inventor: William P. Birkemeier, Madison, Wis.

[73] Assignee: The United States of America as represented by the Secretary of the Air Force, Washington, D.C.

[21] Appl. No.: 179,597

[22] Filed: Aug. 19, 1980

[51] Int. Cl.³ .................................................. G01S 1/44
[52] U.S. Cl. ...................... 343/100 CS; 343/100 CL; 343/100 SA; 343/108 M; 343/757
[58] Field of Search .................. 343/100 CL, 100 CS, 343/100 SA, 757, 757 E, 758, 108 M, 854

[56] References Cited

U.S. PATENT DOCUMENTS

| 3,290,599 | 12/1966 | Vann | 343/757 X |
| 3,299,425 | 1/1967 | Smith et al. | 343/100 CL X |
| 3,366,960 | 1/1968 | Gluck | 343/100 CL X |
| 4,034,374 | 7/1977 | Kruger | 343/100 SA X |

Primary Examiner—Malcolm F. Hubler
Attorney, Agent, or Firm—Donald J. Singer; Willard R. Matthews, Jr.

[57] ABSTRACT

Antenna alignment in troposcatter systems is accomplished by: (1) nutating the antenna receiver beam with a sinusoidal nutation signal to induce envelope modulation on the received signal; (2) crosscorrelating the envelope of the received signal with the nutating signal; and, (3) aligning the average angle of the antenna receiver beam into the position where the crosscorrelation goes to zero.

8 Claims, 3 Drawing Figures

TROPOSCATTER SYSTEM ANTENNA ALIGNMENT

STATEMENT OF GOVERNMENT INTEREST

The invention described herein may be manufactured and used by or for the Government for governmental purposes without the payment of any royalty thereon.

BACKGROUND OF THE INVENTION

This invention relates to troposcatter communications systems and in particular to a method and means for aligning the antennas of such systems.

The conventional approach to aligning troposcatter system antennas in the past has been to maximize the received signal power. However, because of deep, persistent fading on scatter channels, the proper rotating angle alignment for each antenna is difficult to determine by this method and both antennas are often fixed in less than the optimum pointing position.

Accordingly, there currently exists the need for troposcatter antenna alignment techniques that do not depend on received signal power. It is also desirable that such techniques be practiced without the use of complex computer programs or expensive special purpose computers.

Improved troposcatter alignment techniques achieved by alignment methods utilizing doppler shift characteristics instead of signal power maximization and crosscorrelation techniques and data processing procedures instead of computer processing have been developed and are described in detail in the patent application entitled *Precision Antenna Alignment Procedure* of William P. Birkemeier et al Ser. No. 865,269, filed Dec. 28, 1977, now U.S. Pat. No. 4,170,011. Although this technique overcomes some of the deficiencies of prior art approaches and represents a significant step forward in the art, it still requires sophisticated processing equipment as well as the defocusing and focusing of the transmitted and received beams.

The present invention comprehends a new technique to align troposcatter antennas, specifically of the phased-array type. The technique does not require the troposcatter system to be coherent and able to transmit a monochoromatic signal, nor does it require beam defocusing as in the above referenced patent application.

SUMMARY OF THE INVENTION

The strongest troposcatter signals received by troposcatter antennas arrive via the grazing ray at the great circle plane as dictated by the angular dependence of scattering from atmospheric layers. The invention uses this occurrence to align the receiving beam with the favored region on the great circle plane. This is accomplished by sinusoidally nutating the receiving beam pointing angle and cross correlating the induced envelope modulation on the received signal with the nutation reference signal. Alignment is achieved when the resulting correlation is nulled. The invention is most advantageously used with phased arrayed antennas. The process can be repeated using the former transmitting antenna as the receiving antenna to bring both beams into alignment. Both azimuth and vertical alignment can be achieved.

It is a principal object of the invention to provide a new and improved method of aligning troposcatter antennas.

It is another object of the invention to provide new and improved means for aligning troposcatter antennas.

It is another object of the invention to provide methods and means for aligning troposcatter communications system antennas that do not depend upon received signal power.

It is another object of the invention to provide methods and means for aligning troposcatter communications system antennas that do not require the troposcatter system to be coherent.

It is another object of the invention to provide methods and means for aligning troposcatter communication system antennas that do not require beam defocusing.

These together with other objects, features and advantages of the invention will become more readily apparent from the following detailed description when taken in conjunction with the illustrative embodiment in the accompanying drawings.

DETAILED DESCRIPTION OF THE PREFERRED EMBODIMENT

Figure 1:
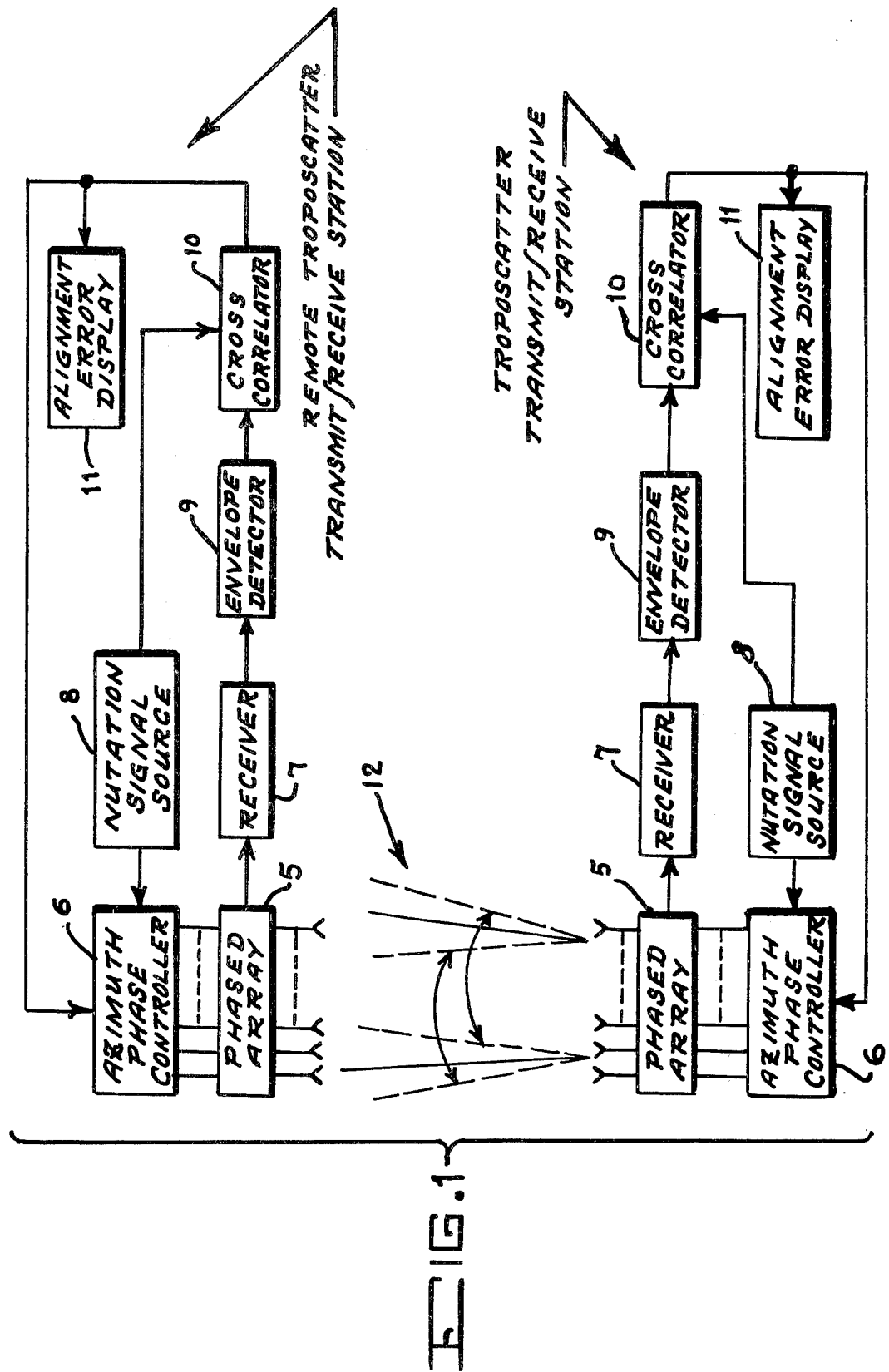
FIG. 1 illustrates in block diagram form two troposcatter system transmit/receive stations employing the principles of the invention.

Referring now to FIG. 1 there is illustrated thereby the basic components required to mechanize the invention. By way of illustration, a local and a remote troposcatter transmit/receive stations are shown. Each comprises a phased array 5, phase controller 6, receiver 7, nutation signal source 8, envelope detector 9, cross correlator 10 and alignment error display 11. The receiving antenna pattern 12 is shown as nutating or dithering (in accordance with the principles of the invention) between the phantom lines indicated. The phantom lines are not to scale and show an exaggerated beam excursion for the purpose of illustration.

The technique of the invention is based upon the fact that on the average the strongest troposcatter signals arrive via the grazing ray at the great-circle plane as indicated by the angular dependence of scattering and/or reflection from atmospheric layers. This has been demonstrated in the periodical article *Indirect Atmospheric Measurement Utilizing RAKE Tropospheric Scatter Techniques,* Part II, Birkemeier et al; Proceedings of IEEE, April, 1969, pp. 554–555. The great circle is defined as a circle on the surface of the earth an arc of which constitutes the shortest distance between any two terrestial points, or two communicating troposcatter stations in the present case. Accordingly, in practicing the invention there is reliance upon the fact that the angular dependence of scattering dominates over the transmitter antenna pattern so that the above statement relating to strongest troposcatter signals is essentially true even for a seriously misaligned transmitting beam at the beginning of the alignment procedure.

Because the strongest signals arrive along paths whose angular deviation from the great-circle plane is small compared to the receiving beam-width it is possible to align the bore-site of the receiving beam with the great-circle plane by sinusoidally "dithering" or nutating the receiving beam 12 in azimuthal pointing angle and then crosscorrelating the induced envelope modulation with the nutation reference signals. Alignment is achieved by directing the average angle of the receiving antenna into the position where the crosscorrelation goes to zero.

Figure 2:
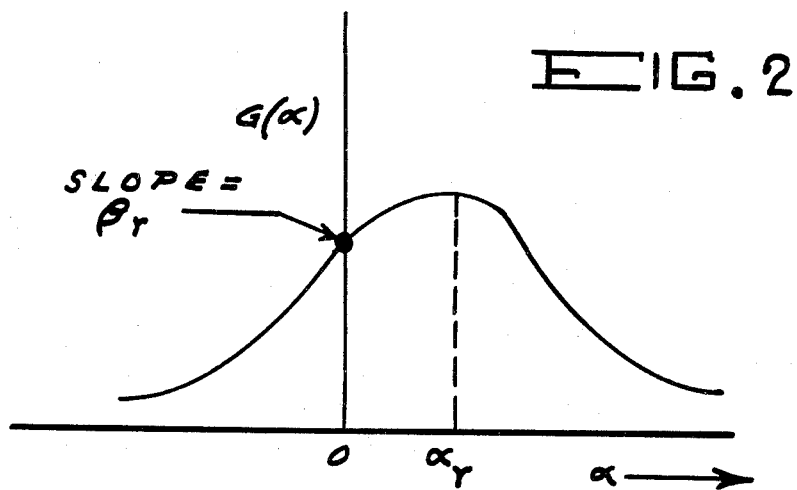
FIG. 2 illustrates the receiving antenna gain pattern via azimuth angle.
Figure 3:
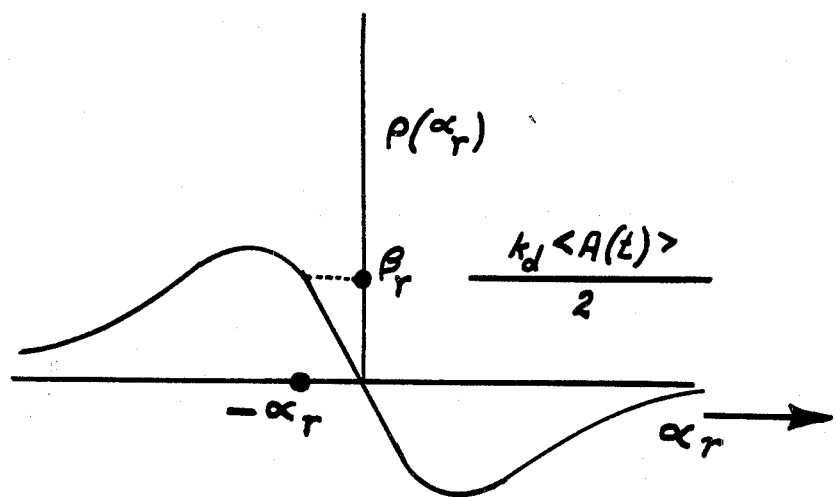
FIG. 3 is a curve illustrating crosscorrelation of the nutation modulated received signal enveloper and the nutation reference signal.

This is best quantified by reference to FIGS. 2 and 3 which for simplicity pertain to alignment to azimuth only.

Suppose the receiving antenna pattern G($\alpha$) is displaced from the great circle by an amount $\alpha_r$ as shown in FIG. 2. There is assumed a typical troposcatter angular dependence such that maximum signal is received via the great circle, in spite of any transmitter or receiver antenna misalignment. Let the slope of the receiving antenna pattern at the great circle be $\beta_r$ volts/radian. If the received envelope without nutation is A(t), then with nutation of frequency $\omega_n$ applied, the envelope V(t) becomes $$V(t) = A(t)[1 + \beta_r k_d \cos \omega_n t] \quad (1)$$

where $k_d$ is a constant that depends on the nutation peak displacement. It is required that $\beta_r k_d < 1$. It is also assumed that the nutation frequency $\omega_n$ is greater than the fading rate or the AGC rtae of the receiver. Then crosscorrelating the envelope with the azimuth nutation reference signal cos $\omega_n t$ there is obtained the crosscorrelation quantity $\rho(\alpha_r)$ given by $$\rho(\alpha_r) = <A(t)[1 + \beta_r k_d \cos \omega_n t] \cos \omega_n t> \quad (2)$$

where the brackets $<>$ indicate time averaging. The cross-correlation can be expressed in terms of the displaced antenna pattern by the slope relation discussed above. That is $$\beta_r = \frac{d}{d\alpha} G(\alpha - \alpha_r)\bigg|_{\alpha = 0} = G'(-\alpha_r) = G'(\alpha_r) \quad (3)$$

where G($\alpha$) is an even function of $\alpha$. Using (3) in (2) the crosscorrelation can be written $$\rho(\alpha_r) = <A(t)G'(\alpha_r)k_d> = \frac{<A(t)> k_d}{2} G'(\alpha_r) \quad (4)$$

The quantity $\rho(\alpha_r)$ has a discriminator-like characteristic as shown in FIG. 3. From equation (4), or this figure, it is apparent that swinging the receiving antenna so as to make $\alpha_r$ zero (aligning it with the great circle) reduces $\rho(\alpha_r)$ to zero and further that the sense of any displacement from the great-circle pointing angle is determined by the sign of $\rho(\alpha_r)$. The quantity $\rho(\alpha_r)$ can thus be used to align the receiving antenna along the great circle direction. Repeating the process using the former transmitting antenna as the receiving antenna should bring both beams into close azimuthal alignment. Several repeated steps may be valuable in reducing the pointing error still further.

A similar operation using the vertical component of the nutation signal as reference to the crosscorrelator will produce vertical alignment as well. This scheme is more suited to phased-array antennas than for paraboloids because the phase array's beam may be nutated electronically rather than mechanically by varying the phasing of the array.

While the invention has been described in one presently preferred embodiment it is understood that the words which have been used are words of description rather than words of limitation and that changes within the purview of the appended claims may be made without departing from the scope and spirit of the invention in its broader aspects.

What is claimed is:

1. The method of achieving antenna alignment with the great circle in a troposcatter-communications system having at least two transmit/receive stations, the receivers thereof having AGC means with a given fading control rate, said method comprising the steps of nutating a receiving antenna beam with a sinusoidal nutating signal to induce an envelope modulation on a signal received from a transmitting station, crosscorrelating the modulated received signal with said sinusoidal nutating signal, and aligning the average angle of said receiving antenna beam into the position wherein the crosscorrelation goes to zero.

2. The method of achieving antenna alignment defined in claim 1 wherein said nutation signal is cos $\omega_n t$, the envelope modulation $V(t) = A(t)[1 + \beta_r k_d \cos \omega_n t]$; $\omega_n$ being the nutation signal frequency, A(t) being the received signal envelope without modulation, $\beta_r$ being the slope of the receiving antenna pattern at the great circle, $k_d$ being a constant for nutation peak displacement, and the product $\beta_r k_d$ is greater than unity.

3. The method of achieving antenna alignment defined in claim 2 wherein the nutation signal frequency $\omega_n$ is greater than the fading rate of the AGC rate of the receiver.

4. The method of achieving antenna alignment defined in claim 3 including the steps of subsequently nutating the receiving antenna beam of the prior transmitting station with a second sinusoidal nutating signal to induce an envelope modulation on a signal received from the previously aligned antenna, crosscorrelating the modulated received signal with said second sinusoidal nutating signal, and aligning the average angle of the receiving antenna beam of said prior transmitting station into the position wherein the crosscorrelation goes to zero.

5. In a troposcatter transmit/receive station having an electronically scanned antenna, a receiver, and AGC means with a given fading control rate the improvement residing in antenna alignment means for aligning the antenna receive beam with the great circle, said antenna alignment means comprising, a nutation signal source providing a sinusoidal nutation signal for nutating said receive beam, a receive beam envelope detector receiving in output from said receiver, and crosscorrelation means crosscorrelating said nutation signal and the output of said envelope detector and providing an output driving said electronically scanned antenna to direct the average angle of said antenna receive beam into the position where crosscorrelation goes to zero.

6. In a troposcatter transmit/receive station the antenna alignment means defined in claim 5 wherein said nutation signal is cos $\omega_n t$, the envelope modulation $V(t) = A(t)[1 \beta_r k_d \cos \omega_n t]$, $\omega_n$ being the nutation signal frequency, A(t) being the received signal envelope without modulation, $\beta_r$ being the slope of the receiving antenna pattern at the great circle; $k_d$ being a constant for nutation peak displacement, and the product $\beta_r k_d$ is greater than unity.

7. In a troposcatter transmit/receiver station the antenna alignment means defined in claim 6 wherein the nutation signal frequency $\omega_n$ is greater than the fading rate of the AGC rate of the receiver.

8. An antenna aligment method comprising the steps of
nutating the antenna receive beam with a sinusoidal nutating signal to provide a received signal having a modulated envelope,
crosscorrelating said nutating signal within the modulated envelope of said received signal, and
orienting said antenna receiver beam in response to the crosscorrelation function.

* * * * *